United States Patent
You et al.

(10) Patent No.: US 6,501,246 B2
(45) Date of Patent: Dec. 31, 2002

(54) HANDY BATTERY CHARGER FOR CELLULAR PHONES

(76) Inventors: Sun Il You, #3-303 Shindong-a apt., 5-426 (21/5) Mansu-dong, Namdong-gu, Inchonshi 405-240 (KR); Gye Seo Park, Na 1-101, Samwoo-villa, 77-8 (26/7) Yeockchon-dong, Eunpyung-gu, Seoul 122-070 (KR)

( * ) Notice: Subject to any disclaimer, the term of this patent is extended or adjusted under 35 U.S.C. 154(b) by 0 days.

(21) Appl. No.: 09/962,879

(22) Filed: Sep. 25, 2001

(65) Prior Publication Data

US 2002/0039016 A1 Apr. 4, 2002

(30) Foreign Application Priority Data

Sep. 30, 2000 (KR) .............................. 00-27454

(51) Int. Cl.$^7$ .............................................. H01M 10/46
(52) U.S. Cl. ...................................................... 320/114
(58) Field of Search ................................ 320/107, 112, 320/114, 115; 429/96, 97, 98, 99, 100

(56) References Cited

U.S. PATENT DOCUMENTS 5,977,747 A  11/1999  Huang ........................ 320/115

*Primary Examiner*—Edward H. Tso
(74) *Attorney, Agent, or Firm*—Madson & Metcalf

(57) ABSTRACT

The invention discloses a handy battery charger comprising a body including upper and lower hollow cases that assemble together to form a receptacle for dry cells, said upper and lower cases having an opening at one end; a first connector with a plurality of connecting pins mounted on the opening, configured to be selectively connected to a second connector disposed at the bottom portion of a cellular phone to supply the output voltage from the dry cells to the cellular phone; a couple of resilient binding clips arranged at opposite ends of the first connector to prevent accidental release of the first connector from the second connector, wherein each of the resilient binding clips includes a hook at an upper end and a pivot axle part at a lower end, the hook having a protrusion extending in a direction to engage the second connector, said pivot axle part being bent in a direction perpendicular to the protrusion of the hook and disposed within a pivot groove formed in the body; and a plurality of positive and negative coil terminals to arrange the dry cells in series electrical connection and to supply the output voltage of the dry cells to the first connector, thereby providing the cellular phone with the dry cells in the recharged state at any time and achieving the cellular phone to be in a continuous use state.

5 Claims, 4 Drawing Sheets

HANDY BATTERY CHARGER FOR CELLULAR PHONES

BACKGROUND OF THE INVENTION

The present invention relates to a handy battery charger for cellular phones, and more specifically, a handy battery charger to supply power to a cellular phone in case an indoor charger using alternating current or a vehicular charger is not available or the battery of the cellular phone is run out and needs a rapid charger.

Cellular phones are widely used. A spare auxiliary battery is often used by the user to replace the original cellular phone battery in the event of battery discharge or failure. If the auxiliary battery is not available, the cellular phone with the discharged battery must be recharged with an exterior charger or hands-free vehicle kit charger.

In order to continuously use a cellular phone, a user should keep a charged auxiliary battery at all times for the cellular phone. However, there is a tendency to only use the battery integral with the cellular phone because it causes user inconvenience to carry an additional auxiliary battery. Further, to carry the auxiliary battery may cause an unintentional short circuit of the recharging terminal of the auxiliary battery, resulting in discharge.

Limited use of the charger according to the place in recharging the cellular phone battery often brings about the battery discharge. Otherwise, the cellular phone should be in a standby state until the charger completes recharging operation.

Since a conventional charger generally utilizes an alternative current source, 110V~V220V, designed for indoor or public use, it becomes difficult to recharge the battery at the outdoor place without an alternating current source. In a vehicle, power of 12~24V direct current is utilized to recharge the battery, but this often necessitates ignition of the vehicle and maintaining the charger and cellular phone inside the car.

SUMMARY OF THE INVENTION

The present invention is derived to solve the above conventional problems, and has an object to provide a handy battery charger for cellular phones, wherein dry cells are held in the charger body to readily recharge the cellular phone battery at any time regardless of the place.

In order to accomplish the above objects, there is provided a handy battery charger for cellular phones, comprising: a body including upper and lower hollow cases that assemble together to form a receptacle for dry cells, the upper and lower cases having an opening at one end; a connector with a plurality of connecting pins mounted on the opening, configured to be selectively connected to the connector disposed at the bottom portion of a cellular phone to supply the output voltage from the cells to the cellular phone; a couple of resilient binding clips arranged at the opposite ends of the connector to prevent accidental release from the connector, wherein each of the resilient binding clips includes a hook at an upper end and a pivot axle part at a lower end, the hook having a protrusion extending in a part at a lower end, the hook having a protrusion extending in a direction to engage the second connector, said pivot axle part being bent in a direction perpendicular to the protrusion of the hook and disposed within a pivot groove formed in the body; and a plurality of positive and negative coil terminals to arrange the dry cells in series electrical connection and to supply the output voltage of the dry cells to the first connector.

Therefore, the user can advantageously recharge the battery of the cellular phone by connecting the connector at the bottom side of the cellular phone to the handy battery charger of the present invention, thereby allowing the cellular phone to be in a continuous use state.

DETAILED DESCRIPTION OF THE INVENTION

Figure 1:
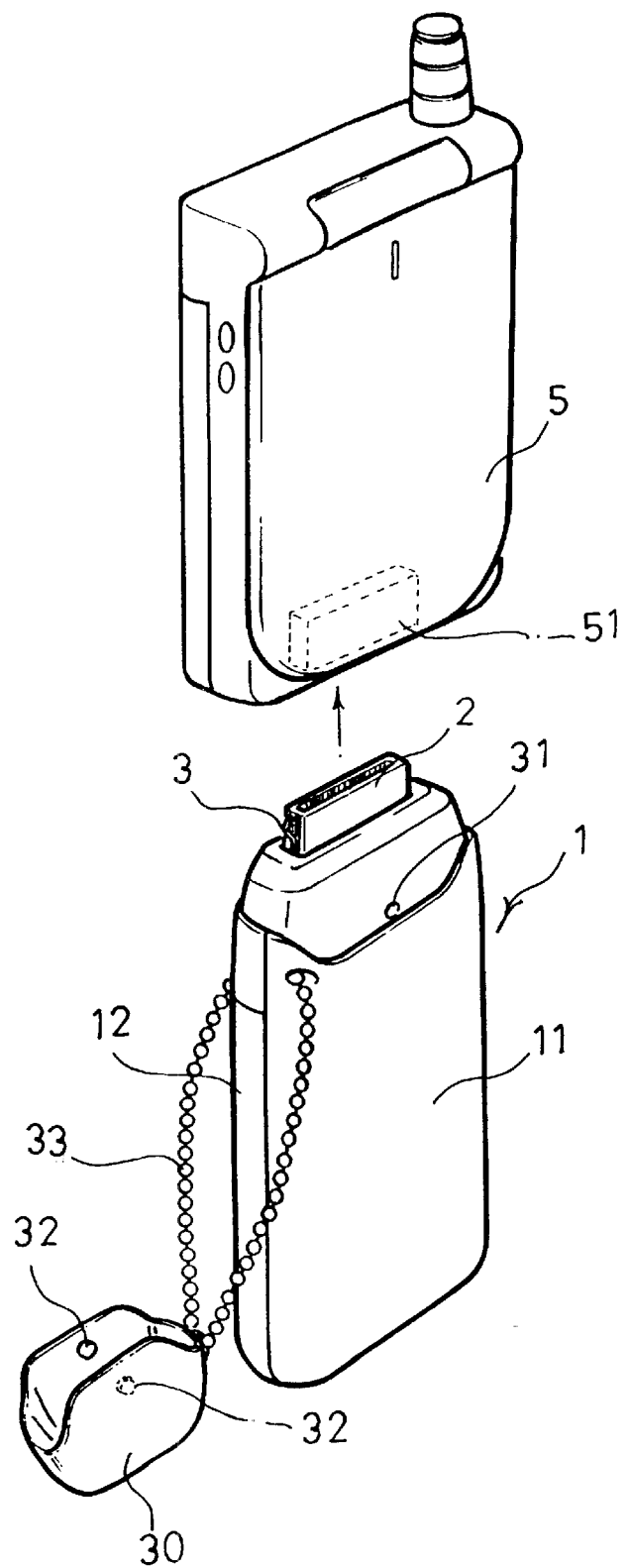
FIG. 1 shows a state for assembly of a cellular phone and the handy battery charger of the present invention.
Figure 2:
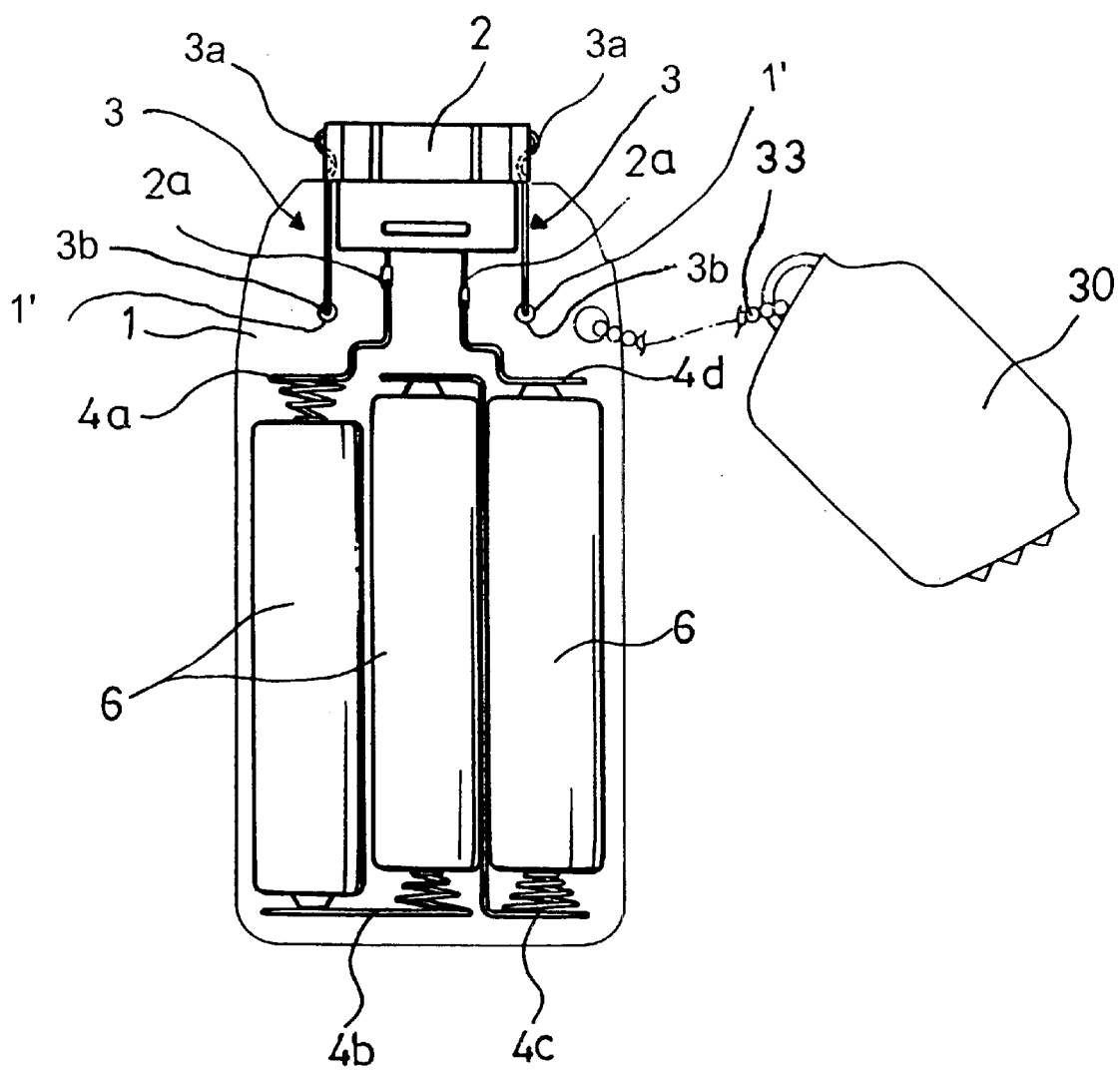
FIG. 2 is a front view of the handy battery charger body in an open state.
Figure 3:
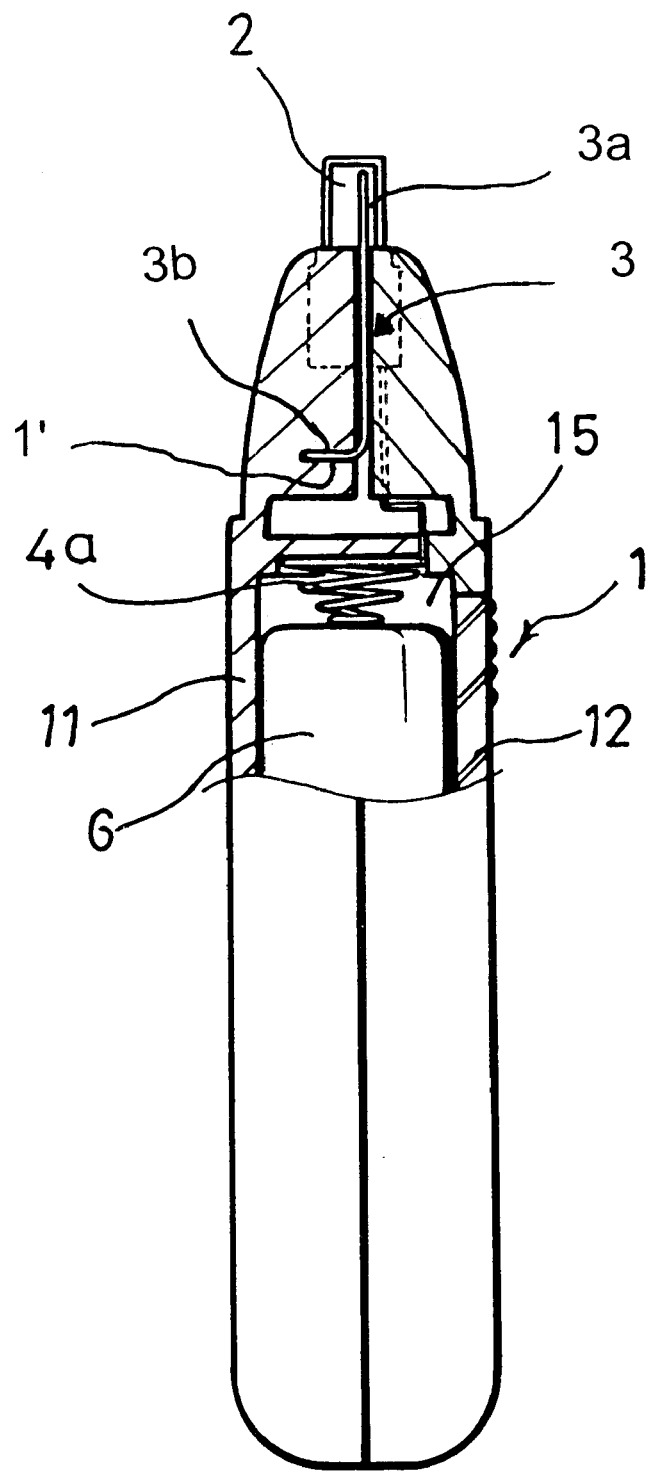
FIG. 3 is a partial cut away side view showing the lock pin mounting.

The handy battery charger of the present invention comprises a body 1 in assembly and disassembly for forming a receptacle for dry cells 15 within the hollow, upper and lower cases 11 and 12; a first connector 2 with a plurality of connecting pins mounted on an opening at one end of the upper and lower cases 11 and 12 which is configured to be selectively connected to a second connector 51 disposed at the bottom portion of a cellular phone 5 to supply an output voltage from the dry cells 6 to the cellular phone; a couple of resilient binding clips 3 are arranged at the opposite ends of the first connector 2 to prevent accidental release of the first connector 2 from the second connector 51, wherein each of the resilient binding clips 3 includes a hook 3a at an upper end and a pivot axle 3b part at a lower end, the pivot axle 3b part is bent in a direction perpendicular to the hook protrusion and disposed within a pivot groove 1' formed in the body 1; and a plurality of positive and negative coil terminals 4a,4b,4c and 4d to arrange the dry cells in series electrical connection and to supply the output voltage of the dry cells 6 to the first connector 2.

FIG. 1 is a disassembled perspective view of the handy battery charger for cellular phones.

The body 1 is separated into detachable/attachable upper and lower cases 11 and 12 by using a suitable thin tool, thereby exposing the receptacle 15 for dry cells. Old dry cells 6 within receptacle 15 may be replaced with the new dry cells 6 of 1.5V.

The dry cells 6 are arranged with a predetermined order within the dry cell receptacle 15 of the body 1. The positive and negative terminals are arranged in series electrical connection by the coil terminals 4a, 4b, 4c and 4d. For instance, three cells 6 may be connected in series to provide an output voltage of 4.5V.

The coil terminals 4a and 4d arranged at the opposite ends are electrically connected by way of insertion or soldering to the connector pin 2a in the connector 2 of the coil terminals 4a, 4b, 4c and 4d, and electrically connected to the power terminal from the connector 51 pins of the cellular phone 5.

Figure 4:
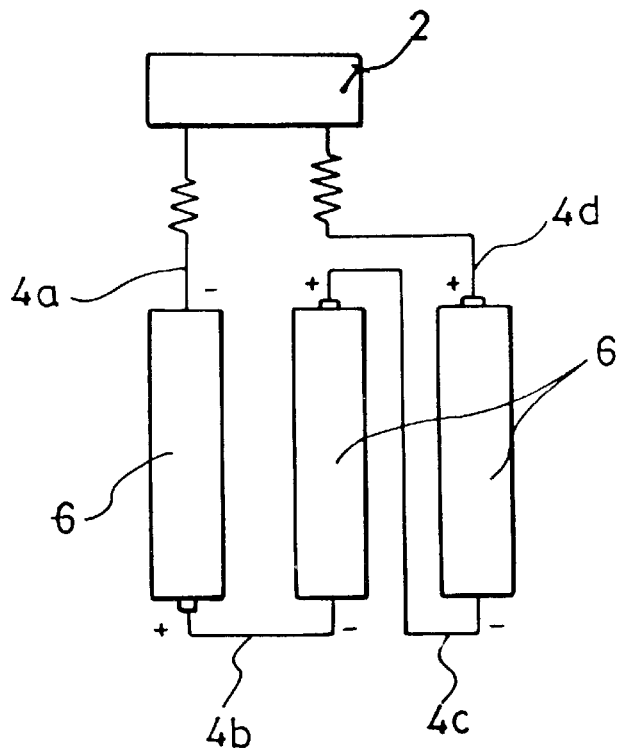
FIG. 4 is a schematic diagram of the connector and the battery in the charger.
Figure 5:
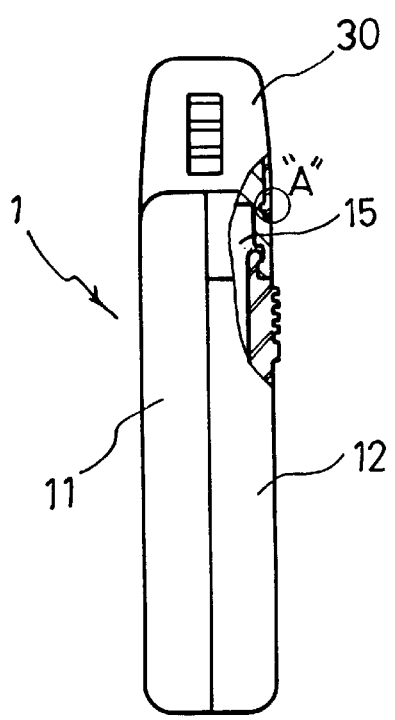
FIG. 5 shows in partial cut away an assembled state of the body cap.
Figure 6:
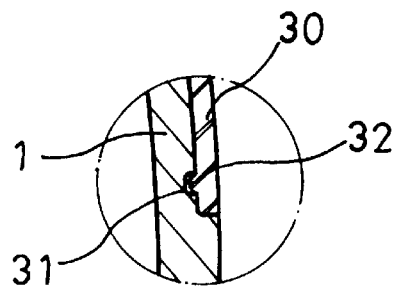
FIG. 6 is an enlarged sectional view of "A" in FIG. 5.

The dry cells 6, positive and negative coil terminals 4a, 4b, 4c and 4d and the first connector 2 are kept in series electrical connection (FIG. 4). In case that the battery of the cellular phone 5 is discharged, the first connector 2 at the top side of the body 1 is inserted to the second connector 51 at the bottom side of the cellular phone 5, so that the dry cell voltage in series electrical connection by the positive and negative coil terminals 4a, 4b, 4c and 4d in the body 1 is supplied to the second connector 51 of the cellular phone 5 through the first connector 2.

This electrical connection enables the cellular phone 5 to be recharged by supplying the dry cell voltage from the handy battery charger to the cellular phone battery of about 3.6V, so that the user can put the cellular phone in desirable use while recharging the battery.

In order to prevent the body 1 from being separated from the cellular phone second connector 51 by an accidental clash or collision, a couple of resilient binding clips 3 are arranged at opposite ends of the first connector 2 of the body 1. One end of the resilient binding clip 3, configured as hook 3a, is inwardly bent perpendicular to the body 1. The hook 3a has a protrusion extending in a direction that will engage the second connector 51 of the cellular phone 5. The other end of the resilient binding clips 3 is bent in a direction perpendicular to the hook protrusion to form a pivot axle 3b. The pivot axle 3b is disposed within a pivot groove 1' formed in the body 1. Each free end of the resilient binding clip 3 where the hook 3a is formed, is maintained at opposite ends of the first connector 2.

In engagement of the first connector 2 to the second connector 51 of the cellular phone 5, the hooks 3a on the resilient binding clips 3 serve to ensure insertion by engaging grooves (not shown) at opposite ends of the second connector 51 of the cellular phone 5. While undesirable separation of the electrical connection is prevented, the user may readily separate them by hand manipulation.

The lower case 12 is configured to be detachable for replacement and reception of the dry cells. The upper portion of the body 1 may be covered with a cap 30 to protect the first connector 2.

A couple of inserting grooves 31 are formed at opposite ends of the body 1 to engage the cap 30. A couple of projections 32 are formed at the cap 30 to correspond to the inserting grooves 31, so that the cap 30 is fixedly secured to the body 1.

The cap 30 preferably includes a connecting string 33 attached to the body 1, in order to prevent the cap 30 from becoming lost. The first connector 2 is protected from contamination by the cap 50.

As described above, the present invention provides a handy battery charger with dry cells to recharge a cellular phone battery via an electrical connection. Advantageously, the handy battery charger may be used at any time and any place to permit continuous operation and charging of a cellular phone.

What is claimed is:

1. Handy battery charger for cellular phones, comprising:

a body including upper and lower hollow cases that assemble together to form a receptacle for dry cells, said body having an opening at one end;

a first connector with a plurality of connecting pins mounted on the opening, configured to be selectively connected to a second connector disposed at a bottom portion of a cellular phone to supply output voltage from the dry cells to the cellular phone;

a couple of resilient binding clips arranged at opposite ends of the first connector to prevent accidental release of the first connector from the second connector, wherein each of the resilient binding clips includes a hook at an upper end and a pivot axle part at a lower end, the hook having a protrusion extending in a direction to engage the second connector, said pivot axle part being bent in a direction perpendicular to the protrusion of the hook and disposed within a pivot groove formed in the body; and a plurality of positive and negative coil terminals to arrange the dry cells in series electrical connection and to supply the output voltage of the dry cells to the first connector.

2. The handy battery charger for cellular phones as claimed in claim 1, further comprising a cap sized and configured to cover and protect the first connector at a top end of the body, wherein the cap is removably attachable to the body.

3. The handy battery charger for cellular phones as claimed in claim 2, wherein the body further comprises a couple of inserting grooves formed at opposite ends of the body and wherein the cap further comprises a couple of projections formed on an interior surface of the cap to correspond to the inserting grooves, so that the cap may be removably attached to the body.

4. The handy battery charger for cellular phones as claimed in claim 2, wherein the cap includes a connecting string to the body.

5. The handy battery charger for cellular phones as claimed in claim 1, wherein a cap is made detachable to protect the first connector at a top end of the body, wherein a couple of inserting grooves are formed at opposite ends of the body and a couple of projections are formed interior of the cap to correspond to the inserting grooves, so that the cap maybe fixedly put on the body, and wherein the cap includes a connecting string attached to the body.

* * * * *